INVENTOR
ROBERT M. CAIN

BY

ATTORNEYS

Feb. 5, 1952 R. M. CAIN 2,584,257

AUTOMATIC PHONOGRAPH

Filed Nov. 6, 1945 5 Sheets-Sheet 2

INVENTOR.
ROBERT M. CAIN
BY Ostrolenk + Faber
ATTORNEYS

Feb. 5, 1952 R. M. CAIN 2,584,257

AUTOMATIC PHONOGRAPH

Filed Nov. 6, 1945 5 Sheets-Sheet 3

INVENTOR.
ROBERT M. CAIN

BY Ostrolenk & Faber

ATTORNEYS

Feb. 5, 1952 R. M. CAIN 2,584,257

AUTOMATIC PHONOGRAPH

Filed Nov. 6, 1945 5 Sheets-Sheet 4

INVENTOR.
ROBERT M. CAIN
BY Ostrolenk & Faber
ATTORNEYS

Feb. 5, 1952 R. M. CAIN 2,584,257

AUTOMATIC PHONOGRAPH

Filed Nov. 6, 1945 5 Sheets-Sheet 5

INVENTOR.
ROBERT M. CAIN
BY Ostrolenk & Faber
ATTORNEYS

Patented Feb. 5, 1952

2,584,257

UNITED STATES PATENT OFFICE 2,584,257

AUTOMATIC PHONOGRAPH

Robert M. Cain, Charlotte, Mich., assignor to Wilcox-Gay Corporation, Charlotte, Mich., a corporation of Michigan Application November 6, 1945, Serial No. 627,061

5 Claims. (Cl. 274—10)

My present invention relates to sound apparatus, and more specifically to record-making apparatus wherein all of the record-making functions are performed automatically.

Thus, my invention is primarily directed to record-making apparatus which requires no skill of any kind on the part of the user and in which all of the record-making functions are initiated, performed and completed by the pressing of a single button.

Originally in the design of recording devices, the essential consideration was the production of high quality recordings irrespective of the complexity of mechanism and operations inherent in the apparatus. For the most part, such prior recording apparatus was of such a nature, with respect to mass of the movable parts, expense of the apparatus as a whole, and complexity of operation, that the recording art was almost entirely a professional art requiring the services of highly skilled technical personnel.

Where simplified recording apparatus was utilized, as in the case of recording for dictation purposes, quality was sacrificed for relative simplicity of operation and the aim of such dictating devices was merely to obtain intelligibility. Variations in recording speed resulting in "wows" and various noises due to the simplification of the operations did not matter where only intelligibility was required. Even in the cases of dictating apparatus where simplified operation was obtained, the apparatus was still cumbersome and much too expensive for ordinary home use.

In the further development of this art as exemplified by Patent No. 2,351,948, assigned to the assignee of the present invention, means were invented whereby high quality recordings could be made by inexpensive apparatus operated by the unskilled home user. In such development it was found that instead of adding mass and complexity to prevent variations in recording speed and to compensate when variations in quality were found, the moving parts of the apparatus could be made light in weight with automatic compensating means incorporated in the apparatus itself and operable on variations in speed or even on wobbling of the turntable or of the record surface to vary the different forces involved so that smooth recording could be obtained.

In such development, the only thing left for the user of the home recording apparatus to do was to place the record on the turntable, turn the switch which would start the turntable rotating, lift the recording arm and move it over to the proper point at the beginning of the record, and then to watch the recording during the time it proceeded until the recording arm and its cutting stylus approached the end of the record; at the end of the recording and prior to removal or playing back of the record, the user then lifted the cutting arm with the recording stylus and returned it to its original position.

While this simple series of operations made possible home recording by unskilled users, it was found in practice that the unskilled user might be somewhat erratic in placing the stylus properly.

The average modern home recording apparatus, and more specifically the type built in accordance with Patent No. 2,351,948, consists of a turntable rotatable around its axis, with a means for rotating the table at a uniform speed. A recording arm has means for holding the recording stylus, which means is responsive to the modulations to be recorded. Means are provided for moving the recording arm and its stylus at a steady rate with respect to the moving turntable so that a groove is cut spirally and continuously between the limits where the cut was started and where it is to be terminated.

The recording arm is also so arranged that it may be moved readily to the beginning of the cut and so that it may be moved away at the termination of the cut. Accordingly, simplified means are provided for connecting and disconnecting the recording arm from the driving means which moves the recording arm with respect to the turntable.

In most home recorders, in order to cut the record, the turntable is started and the end of the cutting arm carrying the stylus is lifted up manually to lift the stylus clear of the turntable and the record blank. This lifting of the stylus end of the cutting arm disconnects the cutting arm from its own driving means so that the cutting arm is free to be turned laterally. The arm is then swung by the user over the record to the point where the cut is to be started and the stylus carrying end of the cutting arm is then lowered so that the stylus engages the record.

Lowering of the arm not only allows the stylus to engage the record but at the same time also engages the driving means for the cutting arm to move the cutting arm laterally. The cutting arm is thus locked with its driving means so that the only movement possible therefor is that imparted to it by the driving means.

Since the driving means is connected by the lowering of the cutting arm, the operator must therefore gauge the lateral position of the arm with respect to the edge of the record while it is still at some distance from the record. While this is not actually difficult to do, there are certain factors, such as visibility in the vicinity of the record, the temperament of the unskilled user who is operating the apparatus, and the arrangement of the cabinet itself that makes this arm placement somewhat erratic. This sometimes results in the margin at the edge of the record being dangerously narrow, making it difficult to find the first groove on playing it back; and sometimes the margin may be exceptionally wide, resulting in waste of recording area.

It is also possible that in setting the arm down, the operator may miss the edge of the record entirely, causing the cutting stylus to be damaged by touching the metal turntable. Also it is necessary in order to prevent damage to the stylus and possible damage to the machine that the operator be on hand ready to remove the cutting arm before the stylus reaches the record label or the limit of its travel and begins to cut deeply into the base material (paper or metal of the record) or into the paper label.

While these factors are of greater importance in connection with home recorders to be operated by the unskilled user, they are also present even in the case of professional recording machines to be used by highly skilled technicians. Thus, the performance of all these operations automatically removes any possibility of the foregoing errors and even further simplifies the entire recording operation.

Thus, it is the purpose of this invention to provide a machine on which it is only necessary to place a recording blank of any size (within the capacity of the machine) on the turntable and to start the machine in operation by simply pressing a push button. In one modification of my invention it may be additionally necessary to simply set an indexing element for the size of the particular record. In another modification, even this setting of the indexing element may be dispensed with.

Once having been started, the machine automatically moves the recording stylus into the appropriate position for the particular size record blank and begins the recording. After it has reached the limit of the recording area, the machine is caused automatically to remove the stylus from the record and restore it to its original at-rest position.

My apparatus is also so designed that if it is desired to interrupt the recording, the operator simply presses the same push button as was used to start the recording into operation whereupon the cutting arm is again caused to be lifted but this time is returned to its original at-rest position.

My apparatus is also so designed that the cutting arm may be operated in the same manner as prior cutting arms free of the automatic feature. This will enable an operator to start a recording at some odd point on the record between the proper beginning or finish point of the record. This would occur, of course, in cases where narrow recorded bands are to be placed on the record, the recorded bands not being related to each other.

An important object of the present invention, therefore, is to arrange a simplified recording device so that all difficult operations with respect thereto will be completely automatic.

Another object of the present invention is to arrange a sound recording device so that the record-making arm will automatically be moved to its proper position for recording regardless of the size of the record simply on pressing a button.

Another object of the present invention is the arrangement of a sound recording device so that the recording arm will be moved to the proper record cutting position, will perform its record cutting function, and will be returned to its original position at the completion of the record cutting function simply by pressing a single button to initiate the entire series of operations.

The foregoing and many other objects of my invention will become apparent in the following description and drawings in which.

Figure 1:
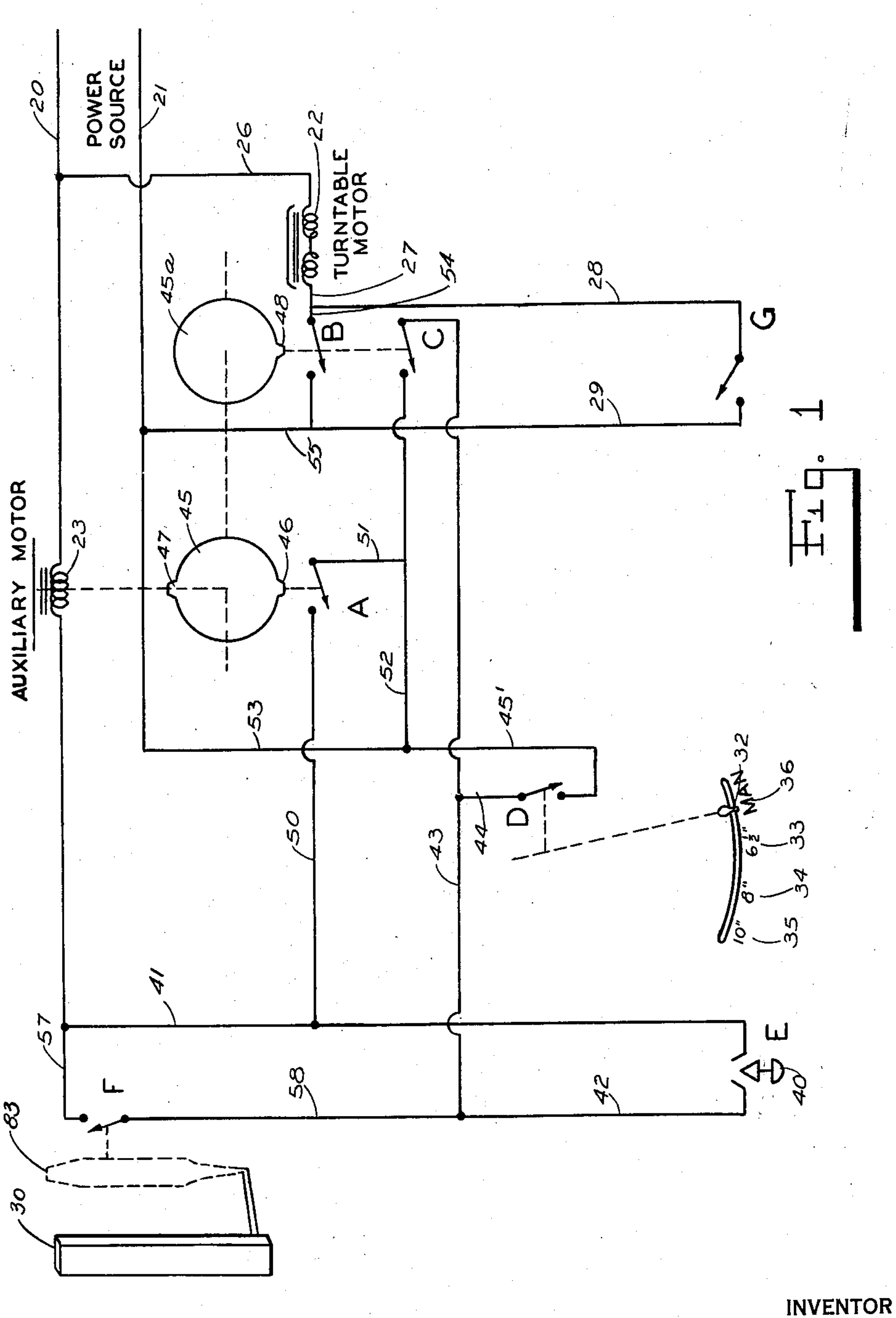
Figure 1 is a circuit diagram illustrating generally the arrangement of switches on cams which makes possible the operation of my novel automatic recorder.

Referring first to the schematic diagram of Figure 1, I have here shown the electrical interconnection of the various parts to obtain automatic operation. The power source is connected to the apparatus through conductors 20 and 21 by operation of a suitable switch. It will be seen that with all the switches A, B, C, D, E, F and G open, both the turntable motor 22 and the auxiliary motor 23 are disconnected.

Closing of switch G by turning the switch button 25 (Figure 2) will energize the turntable motor 22 to operate the turntable 19. The turntable motor 22 will be energized from conductor 20 through conductor 26 to the coils of motor 22, then through conductors 27 and 28 to the closed switch G, then through conductors 29 and 55 back to conductor 21. The cutting arm 30 may be manually lifted and moved in a manner hereinafter described (and also in the manner described in Patent No. 2,351,948) for recording. Also, the playback arm may be manually placed on the recorded record, the turntable being rotated upon the operation of switch button 25 and the closing of switch G.

Thus the apparatus may be operated in the conventional manual manner free of the automatic features.

When, however, the operator desires to utilize the automatic features of the recorder, he will select a record blank and place the same on the turntable without touching the switch operator 25 to close the switch G.

The manual indexing pointer 32 is then moved to the particular point which indicates the specific diameter of the record. Since home recording blanks are commonly made in 6½, 8 and 10 inch sizes, appropriate legends indicated in Figure 1 appear on the base plate of the recorder to guide the setting of the manual indexing pointer 32.

When the pointer 32 is moved to any one of the legends 33, 34 or 35, switch D is automatically closed. When the indexing pointer 32 is at the manual position 36, switch D is opened and automatic operation cannot take place. Accordingly pointer 32 must be moved to one of the positions other than "manual" to permit automatic operation.

Now with the record blank in position on the turntable and the indexing pointer 32 at any one of the appropriate legends 33 to 35 for the particular record size, the operator need merely close the switch E.

Figure 2:
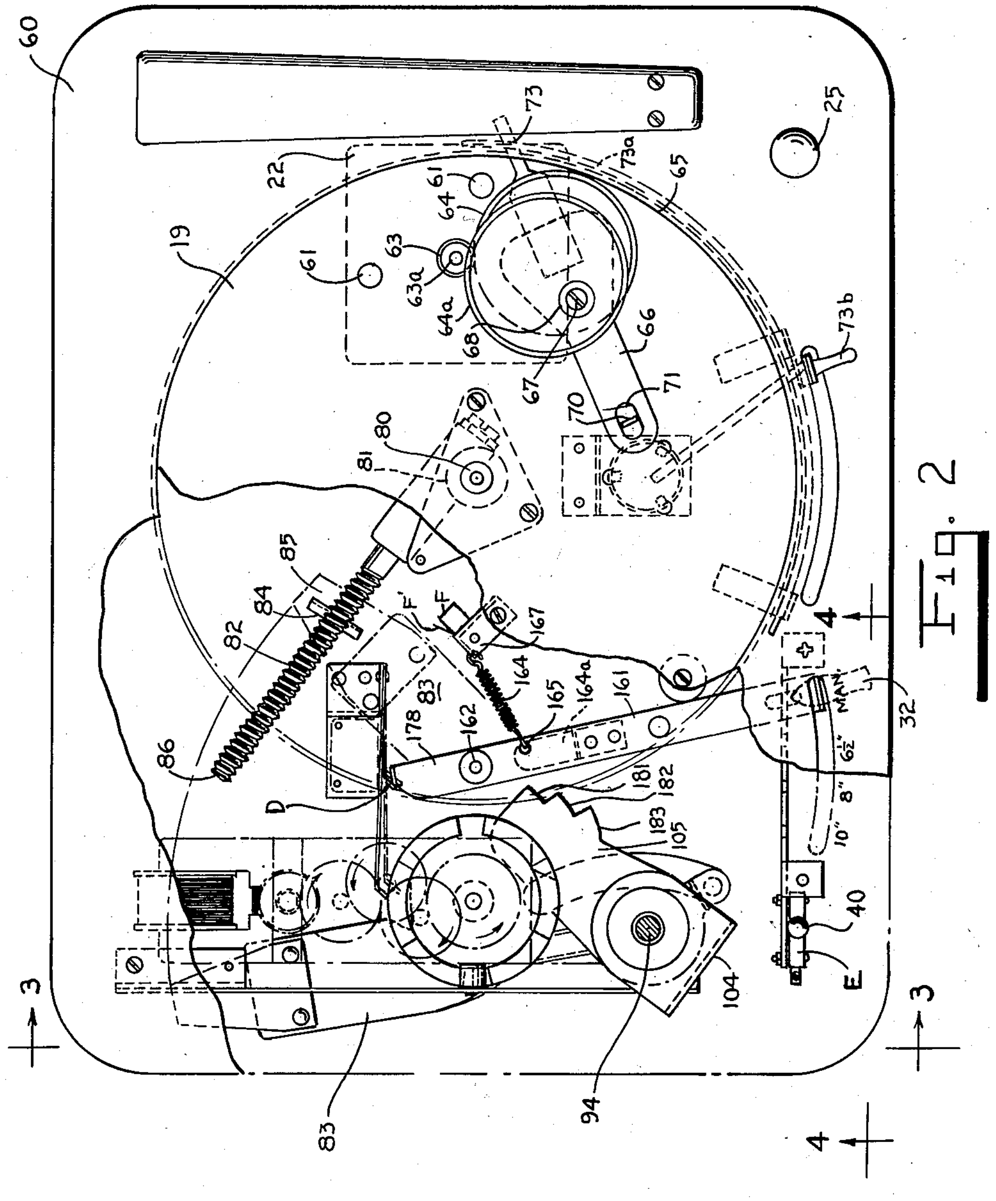
Figure 2 is a top plan view partly broken away of my novel automatic recorder.

Switch E is normally biased open by a spring (not shown) and is pushed to closed position by pressing the switch operator 40 (see also Figure 2). When the switch E is pushed closed, the auxiliary motor 23 begins to operate, being connected into the circuit from conductor 20 to the coil of motor 23, then to conductor 41 through the closed contacts of switch E, to the conductor 42, to the conductor 43, then to conductor 44 through the closed switch D, then to conductor 45' and back to conductor 21.

Switch D is thus in series with switch E, and closing switch E, accidentally or otherwise, will have no effect unless switch D is closed by setting pointer 32 for a record diameter. As soon as the motor 23 begins to operate, it rotates the cam 45*a*. Cam 45 is actually a single member (Figures 2–5) but is here shown in two sections, 45 and 45*a*, to clarify the operation. Cam portion 45 has switch operators 46, 47 and cam portion 45*a* has a switch operator 48.

In the at-rest position of the apparatus, switches A, B and C are open. The moment the motor 23 begins to operate in response to closing of switch E, the cam 45—45*a* begins to rotate and the consequent movement of the switch operators 46 and 48 closes the switches A, B and C.

Switch A is in parallel with switch E so that when switch A is closed, the motor 23 remains energized even though switch E is open. Accordingly the motor 23 will continue to operate even though button 40 of switch E is released. Thus the operator in order to start the mechanism for recording need merely momentarily depress the button 40 of switch E. Touching it for barely a second or even less will result in initiating the entire series of operations.

Thus with the switch A closed, motor 23 is energized from conductor 20 through conductor 41 to conductor 50 to the switch A to conductor 51 to conductor 52 and then through conductor 53 to the conductor 21. Switches B and C are also closed at the same time as switch A. Switch B is in parallel with switch G so that when switch B is thus closed, the turntable motor 22 is operated to turn the turntable 19 from conductor 20 through conductor 26, through the coils of motor 22 to the conductor 27, then through conductor 54 to the switch B, then through conductor 55 back to conductor 21.

Switch C is in parallel with switch D but is in series with the switches E and F hereinafter described and thus prepares the auxiliary motor 23 for further operation in the manner hereinafter described.

At this point it will be seen the turntable motor 22 has been started so that the turntable 19 has begun to rotate and the auxiliary motor 23 has begun to operate. Auxiliary motor 23 through the cam 45 in the manner hereinafter described lifts the cutting arm 30 and moves it over to the correct starting position and then sets it down so that the cutting stylus engages the record at the correct starting position.

All this occurs while the cam 45 is rotating through 180°. At the completion of the 180° rotation of the cam 45, switch operator 47 opens the switch A. Since both the switches A and E are now open, the circuit to the auxiliary motor 23 is opened; motor 23 and cam 45 stop, and cutting arm 30 is now free to be moved by the specific drive means which is coordinated with the turntable 19.

This specific drive means is described in Patent No. 2,351,948, and is more specifically described in connection with Figures 2 and 3.

On completion of the travel of the cutting arm 30 toward the center of the turntable and therefore on completion of the record, the follower 83 connected to cutting arm 30 closes the switch F. This now establishes a circuit from the conductors 20 and 21 to the auxiliary motor 23. This circuit is from conductor 20 to the coil of auxiliary motor 23 to conductor 57, through the switch F to conductor 58, then to conductor 43, through the switch C to conductor 52, to the conductor 53, and then back to conductor 21.

Switch C being parallel to switch D, it can be seen that when switch C is closed, if switch D is caused to open by some means as for instance, an accidental movement against the index pointer 32, the switch C assures that the apparatus will complete its automatic function. That is to say, once the automatic feature has been initiated, it cannot be made inoperative until a full automatic cycle has been completed.

The auxiliary motor then begins to rotate and portion 47 of cam 45 which has opened the switch A is moved away so that switch A is closed and the cam 45 completes its 360° rotation. During this last 180° operation of its full 360° rotation, the cam 45 lifts up the cutting arm 30 and swings it back to the original at-rest position and sets it down. Switch F will, of course, open as soon as the cutting arm 30 begins to move back, but by this time the switch operator 47 on cam 45 has moved away from the switch A, thus permitting switch A to close and establish an alternate parallel circuit through the auxiliary motor 23.

On completion of the 360° rotation of the cam 45, switch operator 46 opens the switch A to stop the operation of motor 23 and switch operator 48 opens switches B and C. Switch D is also opened as hereinafter described. The opening of switch B stops the operation of motor 22 to stop the turntable 19; and the opening of switches C and D arranges the circuit so that even if the switch F is closed during non-automatic operation of cutting arm 30, the auxiliary motor 23 will not be operated.

The particular embodiment of my novel automatic recorder which utilizes the principles of the circuit shown in Figure 1 is shown more particularly in Figures 2 to 6.

Figure 3:
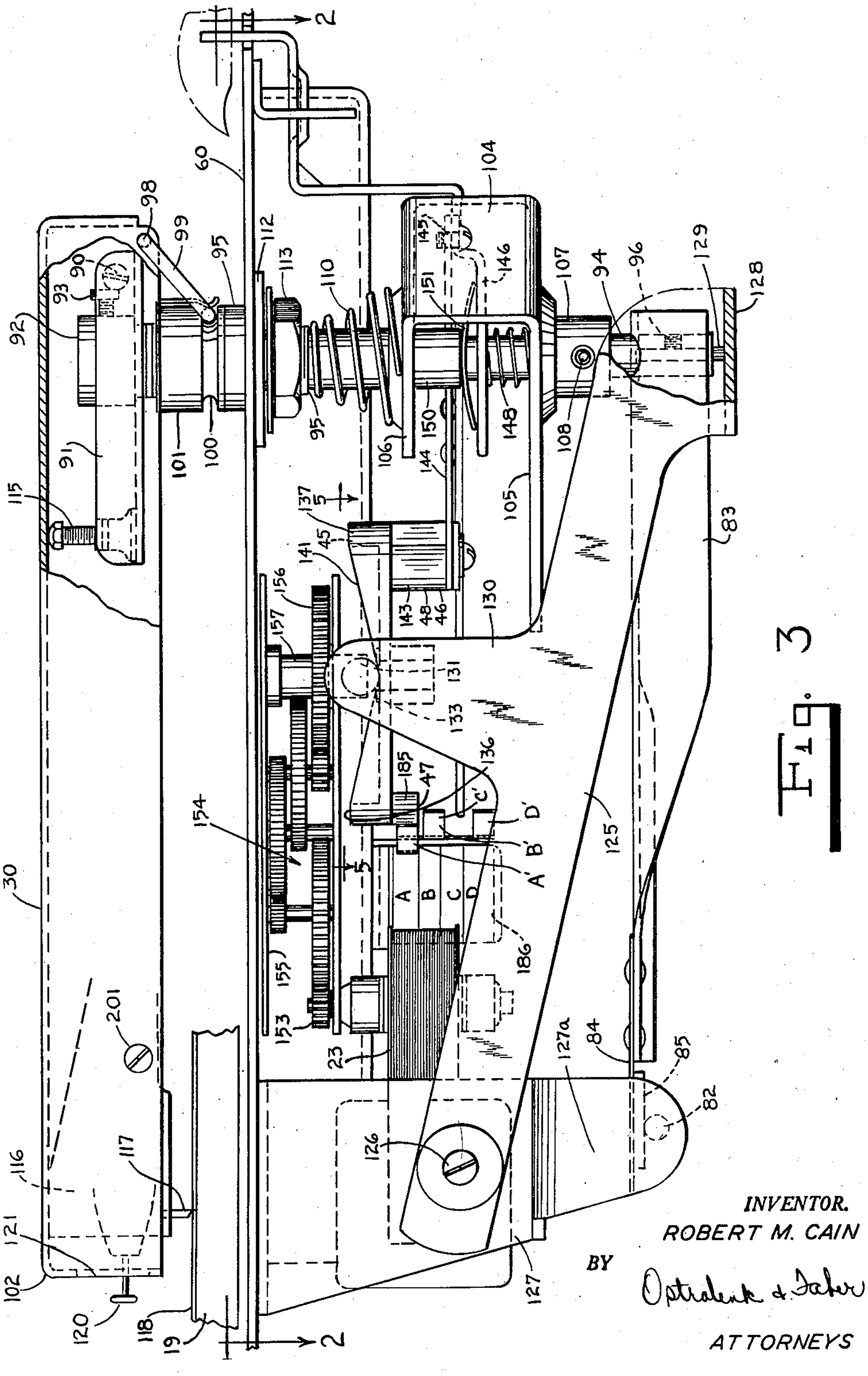
Figure 3 is an enlarged side view of my novel automatic recorder taken from line 3—3 of Figure 2 showing the cutting arm operating mechanism.

Referring first to Figures 2 and 3, all of the elements are supported on a base plate 60, which base plate is mounted in any suitable manner in a cabinet. The turntable motor 22 is secured in any suitable manner as by the bolts 61, 61 to the underside of the base plate 60. Bolts 61 are surrounded by rubber grommets which will permit the motor 22 as a whole to shift slightly around its own axis on the occurrence of a momentary change in load. This principle is more fully described in Patent No. 2,351,948 issued on June 20, 1944 to Paul Stead Gay and requires no further explanation here.

The vertical shaft 63 of motor 22 projects upwardly through an opening in the base plate 60 and drives the rubber-tired idler 64, which idler is engaged between the motor shaft 63 and the flange 65 of turntable 19. The idler 64 is rotatably mounted on a carrying plate 66, which plate is rotatably secured to the mounting plate 60 by the bolt 67 and washer 68; the hole in the plate 66 through which the bolt 67 passes is larger in diameter than the bolt 67.

The movement of plate 66 is limited by the lug 70 of the mounting plate which passes through the slot 71 of the idler carrying plate 66. Carrying plate 66 actually carries two idlers 64 and 64*a* and plate 66 may be shifted by operation of the extension 73 by the handle hereinafter described to shift either idler 64 or 64*a* into position between motor shaft 63 and the flange 65. This specific arrangement of idlers 64 and 64*a* on the idler carrying plate 66 and this specific speed changing driving connection between the motor shaft 63 and the flange 65 of the turntable 19 is fully described in Patent No. 2,241,013 issued on May 6, 1941 to Paul Stead Gay, assigned to the assignee of the present invention, and comprises no part of the present invention.

It is sufficient to point out that the extension 73 may be moved to three positions by the guide bar 73*a* and the speed shift handle 73*b*. In one position the high speed idler 64, engaged between motor shaft 63 and flange 65, will produce 78 R. P. M. of the turntable 19; in the second position the low speed idler 64*a* engaged between the narrow extension 63*a* of motor shaft 63 and the flange 65 of turntable 19 will produce 33 R. P. M. of the turntable 19; and in a third position neither of the idlers 64 or 64*a* will be engaged between motor shaft 63 or 63*a* and the flange 65 so that in this third position there will be no operative connection between the motor and turntable.

The turntable 19 is mounted on the spindle 80. Spindle 80 rotates as the turntable 19 is rotated by the motor 22 and is connected through the gear box indicated at 81 to drive the feed screw 82 to rotate the same. The record cutting arm 30 is connected in a manner hereinafter described to the feed arm 83, which feed arm carries a spring metal extension 84 having a knife-edged pawl 85 bent down to engage the threads of the feed screw 82. When the feed arm 83 is in a lowered position so that its knife-edged pawl 85 engages the thread on screw 82, then the rotation of turntable 19 through the spindle 80 and the gear box 81, causing rotation of the screw 82, will cause pawl 85 to move from the outside end 86 of the feed screw 82 toward the inner end, and hence toward the spindle 80. This will result in corresponding movement of the cutting arm 30.

Cutting arm 30, when in the down position, is thus engaged to be moved inwardly slowly to cut a spiral groove as the turntable 19 rotates. When the cutting arm 30 is raised, the pawl 85 is disengaged from the feed screw 82 and the cutting arm 30 is free to be moved independently of the feed screw 82. This specific operation of the cutting arm 30 and feed arm 83, and the pawl 85 and the feed screw 82 is also specifically described in Patent No. 2,351,948 issued on June 20, 1944, to Paul Stead Gay and does not comprise a part of the present invention.

The present invention relates, as above described, to the means for automatically lifting, moving and lowering the cutting arm 30 to the appropriate position at the beginning or at the end of a record and thus cooperates with the mechanism thus far described.

The cutting arm 30, as shown in Figure 3, is rotatably secured for movement in a vertical plane by the pivot members 90 to the platform 91. Platform 91 is secured to the bushing 92 which is in turn secured by the screw 93 to the vertical post 94 which passes through the journal 95 mounted on the base plate 60 of the apparatus. The lower end of post 94 carries the feed arm 83 previously described, the feed arm 83 being welded or otherwise rigidly mounted to the post 94. Accordingly, any movement of feed arm 83 will result in rotation of the post 94 and corresponding rotation of platform 91 and of the cutting arm 30.

It will thus also be seen that when the cutting arm 30 is rotated manually in its journal 95, feed arm 83 will also be rotated.

In the position shown in Figure 3, the pawl 85 is in the proper position to engage with the thread of feed screw 82 for driving the cutting arm 30 laterally.

The back end of the cutting arm 30 is pivotally connected at 98 to the jack lever 99, the opposite end of the jack lever 99 bearing in the annular groove 100 of the bushing 101. When the front end 102 of the cutting arm 30 is manually grasped and lifted, the cutting arm 30 may be rotated upwardly about the pivot 90. This forces down the pivot 98 of the cutting arm 30, forcing the jack lever 99 down against the annular groove 100 of bushing 101, thus pushing the bushing 101 down against the journal 95. This will cause the vertical post 94 which is secured to the platform 91 to rise and this will disengage the feed arm 83 from screw 82.

The post 94 has secured thereto a U-shaped bracket 104 having a lower horizontal flange 105 having an opening through which the post 94 passes and an upper parallel horizontal flange 106 also having an opening through which the post 94 passes. The U-shaped bracket 104 is held in position by the sleeve 107 which in turn is locked on the post 94 by the set screw 108.

A compression spring 110 surrounding the lower extension 150 of the journal 95 is captured between the lower surface of the nut 113 and the upper surface of flange 106 of the U-shaped bracket 104.

The journal 95 is adjustably locked in appropriate position by the washers 112 and the nut 113 threaded on the lower end of the journal 95.

When therefore the end 102 of the cutting arm 30 is raised, thus resulting in forcing down the jack lever 99 and thereby raising the platform 91, the post 94 is drawn up, driving up not only the feed arm 83 but the U-shaped bracket 104. This compresses the spring 110 biasing the post 94 downwardly once more. Accordingly, as the end 102 of the cutting arm 30 is lowered, the post 94 is forced down by the compression spring 110 to force down the feed arm 83. Thus it will be seen that when the end 102 of the cutting arm 30 is raised, the raising of post 94 raises the feed arm 83 so that the pawl 85 is disengaged from the feed screw 82 and the cutting arm 30 may be rotated freely, free of the feed screw 82.

When the cutting arm 30 is lowered to the position shown in Figure 3, the post 94 is driven down again and the feed arm 83 is also driven down thus re-engaging the pawl 85 of the feed screw 82. At this time the upper surface of the cutting arm 30 drops down to engage the adjustable stop screw 115 carried by the platform 91 while the stylus carrying cartridge 116, which is independently pivoted, moves downwardly so that the cutting stylus 117 engages the record 118 on the turntable 19.

Rotation of the cutting stylus carrying cartridge 116 with respect to the cutting arm 30 is limited by the set screw 120 for the cutting stylus 117 which set screw projects through the slot 121 in the front of the cutting arm 30. The mounting of the cartridge for the cutting stylus 116 is more fully described in Patent No. 2,351,948 above referred to, and requires no further description here. Also the general arrangement of the cutting arm so that when lifted at its end 102 it disengages the feed arm 83 and when lowered once more re-engages the feed arm 83 with the screw 82, is also more fully described in Patent No. 2,351,948.

The post 94 carrying the platform 91 and the cutting arm 30 and also carrying the feed arm 83 may also be independently raised while the cutting arm 30 remains in the same relative position with respect thereto, shown in Figure 3. That is, the post 94 may be raised without the necessity for manually grasping the end 102 of the cutting arm 30 and raising it. When the post 94 is thus raised, the platform 91 and the bushing 101 move up therewith and thus move away from the top of the journal 95.

This raising of the post 94 disengages the pawl 85 of feed arm 83 from the screw 82 and also raises the cutting stylus 117 to clear the top surface of the record 118 on turntable 19.

In order to accomplish this function, the post 94 must rise a sufficient distance so that when the set screw 120 for the stylus 117 rests on the bottom of the slot 121 preventing further downward rotation of the stylus carrying end of the cartridge 116, the point of stylus 117 will clear the top of the record 118.

The automatic features of my invention previously described in connection with the schematic embodiment of Figure 1 perform the operation of raising the post 94 and cutting arm 30, rotating the post 94 and cutting arm 30 to the correct position with respect to the start of the record, and then lowering the post 94 so that the feed arm 83 is engaged with the feed screw 82. At the end of the record the automatic features of my invention again raise the post 94 and the cutting arm 30 to cause the point of stylus 117 to clear the top of the record 118 and then rotate the post 94 and the cutting arm 30 in a reverse direction to clear the turntable 19, and then lower the post 94 and cutting arm 30 to the at-rest position.

The automatic raising and lowering of the cutting arm 30 is accomplished by the cam 45 (Figure 3) co-acting with the lever 125. Lever 125 is rotatably supported on the bolt 126 which is secured to the downwardly extending lug 127 secured to the bottom of the mounting plate 60. The opposite end of the lever 125 is provided with a horizontal platform 128 bearing against the bottom of pin 129. Pin 129 is adjustably mounted vertically with respect to post 94 by the screw 96. It will thus be seen that should the lever 125 be rotated in a counterclockwise direction about its pivot 126, platform 128 will rise, thus raising the post 94. When the lever 125 is rotated in a clockwise direction thus lowering the platform 128, the compression spring 110 will drive the post 94 down once more. To accomplish this purpose, the lever 125 is provided with a substantially vertical extension 130 carrying a roller 131 rotatably mounted with respect thereto. The roller 131 is a cam follower which rides on the upper surface of the cam 45.

Figures 4, 5:
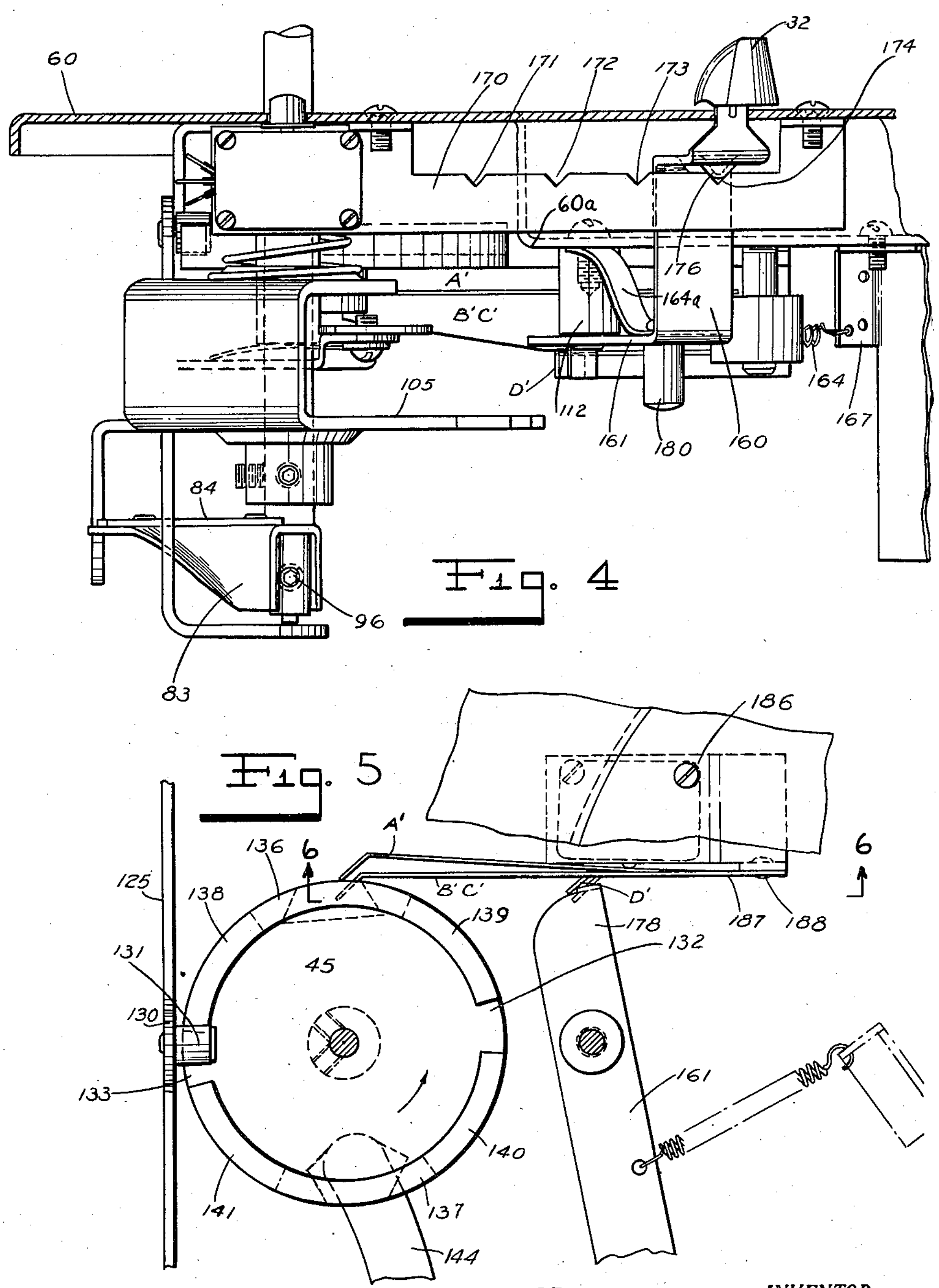
Figure 4 is an enlarged partial end view taken along line 4—4 of Figure 2 looking in the direction of the arrows, showing a portion of the mounting means for my cutting arm and of the indexing mechanism.
Figure 5 is a view taken from line 5—5 of Figure 3 looking in the direction of the arrows, of the cam member of the automatic recorder of Figures 1 to 4.

The upper surface of cam 45, as will be seen from Figures 3 and 5, is provided with a pair of depressed sections 132, 133, 180° apart and a pair of opposite raised segments 136 and 137, the centers of which are 90° away from the centers of the depressed sections 132 and 133.

The raised portions 136 and 137 are connected to the depressed portions 132 and 133 by the ramp elements 138, 139, 140, 141.

Cam 45 has a downwardly extending crank arm 143 which is pivotally connected to the link 144, the opposite end of the link 144 being pivotally connected at 145 to the plate 146. The plate 146 is provided with a suitable opening through which the post 94 passes. Plate 146, is, however, given a resilient upward bias by the relatively light compression spring 148 surrounding the post 94 and captured between the lower surface of plate 146 and the upper surface of flange 105 of the U-shaped bracket 104.

A cupped circular disc 151 of spring metal is provided with an opening receiving the post 94, the spring metal disc 151 being captured between the upper surface of plate 146 and the lower end 150 of the journal 95.

The auxiliary motor 23 drives the pinion 153, which through the speed reducing speed gear train 154 contained in the gear box 155, drives gear 156 mounted on rotatable shaft 157, which shaft carries the cam 45. When the motor 23 begins to operate, then through the gear train 154 it drives gear 156 to rotate the shaft 157 to rotate the cam 45. This rotates the cam so that the ramp 138 moves beneath the roller 131 thus raising the roller 131 up to the elevated portion 136 of cam 45.

At this time lever 125 has been raised, thus raising its horizontal platform 128 to push up the post 94 to a sufficient height so that the stylus point on stylus 117 clears the top of record surface 118.

The parts in Figure 3 are shown in the position they occupy at the completion of the recording. When the post 94 is thus raised, the cutting arm 30 is raised so that the point of stylus 117 clears the top of record surface 118. In its upward travel, post 94 pushing up the flange 105 of bracket 104 compresses the relatively limp spring 148 until it is completely contained in a depressed cup shaped portion of the flange 105. At this time the upper surface of flange 105 contacts the under-surface of plate 146. Further rise of post 94 and flange 105, now bearing upwards against plate 146, causes compression of the circular cupped spring plate 151 captured between the plate 146 and the lower end 150 of journal 95. This produces a frictional clutch-like connection between the plate 146 and the flange 105 to which is secured post 94 by means of bushing 107.

Now with the post 94 raised by reason of the fact that the lever 125 has been raised with the cam follower 131 on section 136 of the cam 45, the same rotation of the cam 45 has pulled the link 144 to the left, rotating the plate 146 so that its pivot 145 moves to the left around the far side of the post 94 (with respect to Figure 3). Rotation of the plate 146, therefore, is transmitted to the post 94 after the post 94 is raised a distance sufficient to establish the frictional clutch connection.

Thus the initial rising movement of the lever 125 owing to the operation of cam 45 first raises the post 94. The flange 105 is so adjusted that a driving connection between the plate 146 and the post 94 is established only after the roller 131 has moved up the ramp 138 an amount sufficient to have lifted the cutting arm 30 and stylus 117 high enough to clear the record 118.

At this time the post 94 by reason of the movement of link 144 and rotation of plate 146 is rotated to swing the arm 30 out and clear of the record. This rotational movement is completed before the cam 45 has rotated to such an extent that the cam follower 131 has cleared the raised portion 136 of the cam. On completion of this rotational movement, the cam follower 131 on further movement of the cam 145, rides down the ramp 139 to the depressed portion 132 and the arm is lowered back to the "at-rest" position.

It should be noted that the drive for rotation of post 94 is a frictional one so that drive may be interrupted when necessary. When the arm 30 is swung out, it is important that this arm 30 and its feed arm do not swing out too far. Thus an extension 127*a* is provided for the downwardly extending lug 127, this extension being engaged by the pawl carrying extension 84 of the feed arm 83 during the outward movement of the feed arm 83 and the arm 30. When the extension 84 strikes the stop 127*a*, further rotation of the plate 146 owing to the operation of cam 45 will not result in rotation of post 94, this rotation being impeded by the stop; and instead the plate 146 will slide frictionally with respect to the flange 105.

Similarly during inward movement of the arm to engage an appropriate portion of the record surface, the arm will first be lifted up and then moved in, and then when it reaches the appropriate position the arm will be stopped even though the plate 146 continues to rotate, so that the arm will be prepared to drop at just the right position.

This arrangement also prevents damage to the mechanism should the arm 30 be manually grasped and held during automatic operation.

It should be noted that on completion of the outward movement of the arm 30, the position of cam 45 is 180° away from the position shown in Figure 5, and the depression 132 of the cam is under the roller or cam follower 131. The link 144 and crank 143 of the cam 45 have been rotated so that the crank 143 is then on the left side of cam 45 with respect to Figure 3, and the pivot 145 of plate 146 is on the left side. Now when it is desired to start recording once more, operation of the motor 23 will cause further rotation of the cam 45 in the same direction so that the roller 131 will ride from the depression 132 up on the ramp 140 to the raised portion 137 of the cam. This will again raise the post 94 to raise the cutting arm as previously described and will engage the flange 105 to establish the driving connection between plate 146 and post 94.

Thus, after the post 94 has been raised, it will be rotated again with the link 144 and pivot 145 on plate 146 now moving to the right on the far side of post 94 (Fig. 3) to rotate the arm 30 to a position above the record. This rotation occurs while the roller is up on the raised portion 137 of the cam. Then as the roller rides down the ramp 141, the arm 30 is lowered until the roller reaches once more the depression 133 where the arm 30 will be at its lowest position.

Should a recorder be made to cut only one size record, then the cam 45, the link 144 and the plate 146 may be made for that particular size. However, since in commercial practice record blanks are provided having diameters of 6½, 8 and 10 inches, provision must be made for automatically stopping the cutting arm 30 on its inward movement at the appropriate place. This is the primary reason for the provision of the friction flange 105 which will permit the completion of the movement of the cam 45 even though the arm 30 is held at a specific position.

Assume, for instance, that a record having an 8″ diameter is to be cut, the cam would be operated from a position where the roller 131 rests in depression 132 through 180° to the position where the roller 131 rests in depression 133. The arm 30 will be lifted while the roller is moving up the ramp to the raised portion 137 and the arm 30 will be rotated to the appropriate position while the roller is on the raised portion 137. However, the arm 30 will reach the correct position for an 8″ record before the raised portion 137 has moved out from under the roller 131.

The provision of the friction clutch connection comprising plate 146 and flange 105 makes it possible to stop the movement of the arm 30 at the correct position while the cam and the plate 146 continue their full rotation.

The particular stop member which is used for this purpose is an adjustable one and may readily be seen in Figure 2 taken in connection with Figure 4. The stop member comprises the manual indexing pointer 32 which is connected by the bracket 160 to the lever 161, the said lever 161 being pivoted on the downward extension 162 secured to the underside of the mounting plate.

The lever 161 is biased toward the right by the tension spring 164 connected at 165 to a suitable opening in the lever 161 and connected at its other end to the downward extending lug 167 secured to the underside of the mounting plate. Notched index plate 170 is provided secured to the underside of the mounting plate, the said index plate 170 having notches 171, 172, 173, 174 for 10″, 8″, 6½″ records, respectively, and for manual operation.

Lever 161 has a small extension 176 which can engage in any of the notches. The tension spring 164 is so arranged that it tends to pull the lever toward the right. Leaf spring 164*a* bearing against depressed surface 60*a* of mounting plate 60 biases the lever 161 downwardly. The lever 161 is sufficiently loosely mounted on its pivot 162 so that it may have some vertical play.

The lever 161 has an extension 178 on the opposite side of the pivot 162 from the indexing pointer 32 which extension engages the operator of switch D when the lever 161 is rotated to the manual position with the extension 176 of the lever engaged in notch 174.

When the pointer 32 is moved so that extension 176 engages one of the notches 171, 172, 173, then the lever 161 is rotated about its pin 162. The lever 161 has a downwardly extending vertical pin 180 which is arranged selectively to engage notches 181, 182 and 183 in the side of the lower horizontal flange 105 of bracket 104.

Ordinarily during operation of the record maker with the stylus of the cutting arm engaging the record, the flange 105 as seen in Figure 4 is below the level of pin 180.

When the post 94 is raised to be rotated inwardly toward the record cutting position, then the flange 105 is raised so that its side surfaces having notches 181 to 183 may engage the pin 180. With the lever 161 set with its extension 176 in notch 171, the setting is for a 10″ record. Consequently when the post 94 is now raised and rotated inwardly with its bracket 104, it will rotate inwardly until portion 183 on the side of flange 105 strikes pin 180.

Further inward rotation of the arm 30 will be stopped while the cam 45 may nevertheless continue its operation to complete its 180° movement. The provision of the frictional clutch connection between driving plate 146 (driven by cam 45) and the post 94 permits the post 94 thus to be stopped even though the cam completes its cycle. Accordingly the cutting arm 30 will be held at the 10″ position by the engagement of portion 183 of flange 105 with the pin 180.

On completion of the 180° cycle of rotation of cam 45 so that portion 133 thereof moves under the roller 131, the post 94 will have dropped and the cutting arm 30 will have lowered into position where the stylus 117 engages the record at the right position for a 10″ record. The lowering of post 94 lowers also the flange 105 so that it drops below pin 180. Thus the flange 105, post 94 and arm 30 may now be moved inwardly by the feed screw 82 engaging the pawl 85 of the feed arm 83 without any interference from the pin 180 of lever 161.

When the recording operation is completed and the appropriate switch is closed to operate the motor 23 once more, the cam moves from the position shown in Figure 5 counterclockwise to the position 180° removed so that the depression 132 moves under the roller 131. The first motion of the cam moves the ramp 138 beneath the roller 131 to lift post 94, feed arm 83 and cutting arm 30. This also lifts the flange 105 which has moved under the pin 180. Lifting of the flange 105 pushes up the pin 180, thus pushing lever 161, thereby lifting extension 176 out of the notch 171. The tension spring 164 promptly pulls the lever 161 over to the manual position where extension 176 engages notch 174. The cutting arm now is moved back to the at-rest position where it is lowered.

Thus it will be seen that provision is made for protecting the apparatus from any carelessness by the user when record sizes are changed. Assuming, for instance, that the operator sets the device for a 10″ record with the extension 176 of lever 161 engaged in notch 171: on completion of the 10″ record, if the lever 161 were left at the 10″ position and if the operator were now to place a 6½″ record in position on the turntable, then on the next operation of the apparatus the stylus will be set down on the turntable about 2″ short of the 6½″ record and the stylus would be ruined. Thus in order to prevent this result, the lever 161 is returned to the manual position on completion of the record and when the operator places the next record on, he must place the index pointer 32 and also lever 161 in one of the notches 171, 172 or 173 before automatic operation is possible. If he fails to do so, switch E will simply not operate.

Since his attention is called to the diameter of the record by reason of the fact that he must place the index pointer 32 at the right position, he will be careful to place it at the correct position. Should he forget to place the index pointer 32 at the correct position, and instead should he leave it at the manual position, then as pointed out in connection with Figure 1 the switch D will remain open and automatic operation of the device will be prevented.

Switch D is closed only when the manual operating lever is in one of the notches 171 to 173 corresponding to one of the positions 35, 34 or 33 of Figure 1 and it is only when the manual index pointer 32 is at one of these positions that automatic operation is possible.

As will be seen from Figure 3, the crank extension 143 of cam 45 corresponds to the cam operators 48 and 46 of Figure 1 and the two cams 45 and 45a of Figure 1 are embraced in the single cam 45 of Figure 3. The diametrically opposed downward vertical extension 185 of the cam 45 of Figure 3 corresponds to the switch operator 47 of the cam of Figure 1. These members operate respectively the switch operators for switches A, B and C.

The various switches A, B, C and D are mounted beneath each other in the switch housing 186 and the switch operator 187 therefor comprises a spring metal plate secured in position to the switch housing 186 by the rivets 188. All of the switches A, B, C, D are normally closed and operable to open position by the switch operators A′, B′, C′ and D′. The switch operator A′ (Figure 6) for switch A is engaged by both the extensions 185 and 143 when the cam is rotated to bring these extensions opposite the switch operator A′. Switch operator B′—C′ is engaged only by extension 143 and not by extension 185 and is thus engaged to open switches B and C only when the arm 30 is in the "at-rest" position outside the turntable 19.

Figure 6:
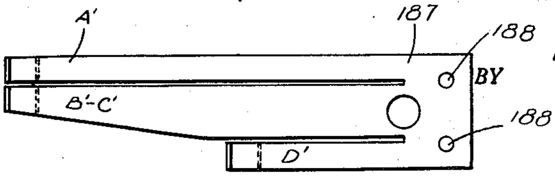
Figure 6 is a front view taken on line 6—6 of Figure 5 looking in the direction of the arrows, of the switch operator of Figure 5.

Switch operator B′—C′, as seen in Figure 6, is sufficiently wide to actuate both switches B and C. Switch operator D′ (Figures 3, 5 and 6) closes switch D only when the lever 161 is set with the index pointer 32 at the manual position. In this position the end 178 of lever 161 engages actuator D′ and closes switch D. At all positions of lever 161 other than manual, the end 178 is not engageable with the actuator D′ and the switch D therefore is closed for these positions.

Switch F of Figure 2 which is normally open is provided with a switch operator F′ engaged by arm 83 at the completion of the recording movement.

Switch G operated by the knob 25 is simply an on-off switch for the turntable motor in parallel with switch B and may take any suitable form.

The general operation of my novel automatic recorder has been described in connection with Figure 1. The schematic operation of Figure 1 taken in connection with mechanical operation of the elements of Figures 2 to 6 inclusive, demonstrates the simplicity of my invention.

With the cutting arm 30 at the at-rest position, a record blank, say 8″ in diameter, is placed on the table. The index pointer 32 is moved over to the 8″ position 34 of Figure 1. At this time the extension 176 connected to the index pointer 32 and the lever 161 engages the notch 172 in the index plate 170, Figure 4. The switch D is closed since the end 178 of lever 161 has been moved away from the switch operator D′ of switch D (Figure 5).

The operator of the apparatus now presses button 40 (Figures 2 and 1) to close the switch E. This, as previously described, closes the circuit to auxiliary motor 23 and results in rotation of the cam 45. At this time cam 45 is in a position where the depressed portion 132 (Figures 5 and 3) registers beneath the roller 131 of lever 125 and the link 144 and crank member 143 are on the left side of the cam with respect to Figure 3 with the plate 146 and its pivot 145 in a corresponding position, with the pivot 145 also on the left side of post 94.

As the cam now begins to rotate, ramp 140 moves under the roller 131, the cam rotating in a counterclockwise direction with respect to Figure 5. This begins to raise the post 94 and the cutting arm 30 since the lever 125 is being pulled up, pushing its horizontal portion 128 against the pin 129 of post 94. At the same time the movement of the crank extension 143 away from the left hand position closes switches A, B and C by releasing switch operators A', B' and C'. Switch A closes a circuit in parallel with switch E so that switch E may be released. Thus it requires only momentary closure of switch E to start the apparatus and switch E may be biased open by a suitable spring.

The closing of switch B starts the turntable motor while the closing of switch C completes a circuit which parallels switch D thereby preventing the disabling of the automatic feature, and so that on the completion of recording, closing of switch F will start the motor 23 once more. Raising of the post 94 by reason of the fact that the cam 45 moves the ramp 140 beneath the roller 131 so that the roller 131 rides up on the raised portion 137 results in a frictional clutch connection between plate 146 and post 94. This results in rotation of post 94 and the feed arm 83 of the associated cutting arm 30 in a clockwise direction with respect to Figure 2.

Notch or indexing surface 182 (where the setting is for 8″ records) of the flange 105 now strikes the pin 180 of the indexing lever 161 and stops further rotation of post 94 and its associated cutting arm and feed arm. The cam 45 can, however, follow through its full 180° movement since the connection between the cam 45 and post 94 is only a frictional one between the post 94 and plate 146. As the cam completes its 180° movement, ramp 141 moves beneath roller 131 and finally the depressed portion 133 of cam 45 moves beneath the roller 131.

The moving of ramp 141 beneath the roller 131 permits post 94 to drop, thus lowering the feed arm 83 into engagement with the feed screw 82 and thus lowering the cutting arm 30 so that stylus 117 engages the record surface 118. This also lowers flange 105 so that by the time the depressed portion 133 of the cam 45 moves beneath the roller 131, the flange 105 is below the end of the pin 180. Pin 180, therefore, can no longer impede clockwise rotation of flange 105 and hence of post 94 and cutting arm 30.

At the same time, extension 185 of the cam (corresponding to extension 47 of Figure 1) moves against switch operator A' to open the switch A. This opens the circuit to the auxiliary motor 23 and stops the operation of the cam and associated elements.

Now the feed arm 83 is in a position to operate the cutting arm 30 for recording purposes.

At the completion of the recording, the side of follower arm 83 strikes switch operator F' of switch F and closes a circuit in parallel with switch A through switches F and C to the auxiliary motor 23. This starts the cam rotating once more to continue its counterclockwise rotation with respect to Figure 5 from the position shown in Figures 3 and 5 back to its original position.

The link 144 now pulls on pin 145 instead of pushing on it as it did previously and rotates plate 146 back counterclockwise with respect to Figure 2. The rotation of cam 45 also lifts the roller 131 up on ramp 138 and finally up on the raised portion 136. As the ramp 138 moves under the roller 131, platform 128, post 94, and flange 105 are raised. Flange 105 having rotated beneath pin 180 during the recording operation now pushes upward against pin 180 thereby lifting the extension 176 of the index lever 161 out of the notch 172. The tension spring 164 then causes the index lever 161 and the pointer 32 to move to the "manual position."

The upward movement of post 94 also engages the friction clutch comprising disc 146 and flange 105 so that a driving connection is established between the cam 45 and post 94. The cutting arm 30 is raised by this operation clear of the record surface 118 and the cutting arm is also rotated back counterclockwise with respect to Figure 2 to its original at-rest position.

The rotation of the cam causes the extension 185 (corresponding to switch operator 47 of Figure 1) to move away from member A' operating switch A; thus when further rotation of the cam 45 causes counterclockwise movement of the arm 30 and follower arm 83, an alternate or parallel circuit has been established to the auxiliary motor 23 so that the opening of switch F, occurring when arm 83 moves outward, will not interrupt the cycle.

The motor 23 continues to operate until depressed portion 132 is again moved beneath the roller 131, at which time the post 94 and cutting arm 30 have been lowered back to their original postion outside the turntable.

At the same time, the crank arm 143 which operates the switch operators A', B' and C' has moved in position to open all of the switches. The auxiliary motor is thus stopped by the opening of switch A, turntable motor 22 is stopped by the opening of switch B, and opening of switch C arranges the circuit so that unless the index pointer 32 is again moved from "manual" to some other position thereby re-establishing the automatic functions, the closing of either switch F or switch E will not result in operation of the auxiliary motor 23.

Thus, as far as the operator is concerned, he need merely select a record, place it on the turntable, set the manual index pointer 32 to the size of the record and momentarily press the button E. Then he need merely watch the cutting arm 30 be lifted up, moved over and placed in the appropriate position on the record.

A sound groove may be cut from a suitable microphone connected through a suitable amplifier to the cutting stylus cartridge 116. The operator during this cutting process need pay attention only to the manner in which the speech or music is being impressed on the microphone and need pay no attention to the operation of the recorder itself.

When the appropriate area of the record has been recorded so that no further recording will occur, the arm 30 is automatically lifted up and returned to its original position.

The operator thus has nothing to do but place the record on the turntable, set the index pointer for the size of the record and press a button. Everything else from the initiation of the recording cut to the termination thereof and re-setting of the cutting arm is automatic.

While I have here shown the indexing lever 161 arranged so that it will be tripped back to manual position on completion of the recording, it will be obvious that pin 180 may be so mounted on lever 161 that upward movement of pin 180 by the flange 105 when it is lifted at the end of the record will not result in restoring the lever 161 and pointer 32 to manual position. Thus the pin 180 may simply be spring biased to a lower position where it will be engaged by the side of flange 105 to stop the cutting arm at the appropriate record starting position, the spring being so arranged that when the record is finished and flange 105 is lifted, it will simply raise the pin 180 without lifting the lever 161 to disengage extension 176 from the proper notch.

When the pin 180 is so arranged then the pointer 32 will not be automatically restored to "manual" at the end of each recording. Thus the operator having once set the pointer, say for 10″ records, can continue to cut 10″ records one after the other without re-adjusting the pointer; but he must re-adjust the pointer to another position when he changes the size of the record. The value of having the pin 180 rigid with the lever 161, so that the lever 161 will be returned to "manual" position at the completion of each recording, lies in the fact that when records of different sizes are cut successively, the attention of the operator will be called to the specific setting required since the automatic features of the device will be disconnected by the automatic movement of the lever 161 back to "manual" position at the end of each recording.

In a slight modification of my record indexing device shown in Figures 7 to 10, I may provide an automatic margin finder which will set the recording arm down at the correct position with respect to each record without requiring any adjustment on the part of the operator. Thus when the margin finder of Figures 7 to 10 is used, manual indexing pointer 32 and lever 161 will not be needed. Also the pin 180 will not be needed nor will the specific notches 181, 182 and 183 in the side of flange 105 be required.

Figure 7:
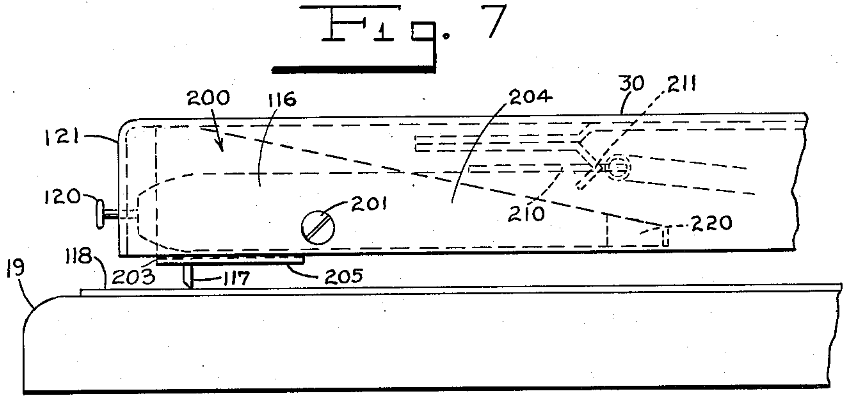
Figure 7 is a side view of the cutting arm of Figure 3, showing a slight modification thereof to carry an automatic indexing member.

In Figure 7 I have shown a margin finding device 200 mounted on the cutting arm 30. The margin finding device 200 is here shown in "non-operative" position with the cutting arm 30 in position so that the stylus 117 engages a record blank 118 on the turntable 19.

Margin finding device 200 is pivoted for rotation in a vertical plane with respect to cutting arm 30 by the pivoting bolt 201 which secures it to the outer flange of the cutting arms 30, that is, to the flange farthest from the turntable. The margin finding member 200, as will be seen, is a lever having an extension 203 forward of the pivot 201 and a back extension 204 back of the pivot 201. The lower end of extension 203 of the margin finding device 200 has a re-entrant flange 205 which engages beneath the cartridge 116 which carries the cutting stylus 117.

Cartridge 116 has a knife-edged tail extension 210 bearing in the V-shaped member 211 secured to the underside of the cutting arm 30. Accordingly the cartridge 116 pivots in the notch 211 and when the arm 30 is raised so that stylus 117 is out of engagement with the record surface 118, the cartridge 116 drops down around the pivot 211 until the set screw 120 reaches the bottom of the slot 121 at the front of the cutting arm 30.

Figure 8:
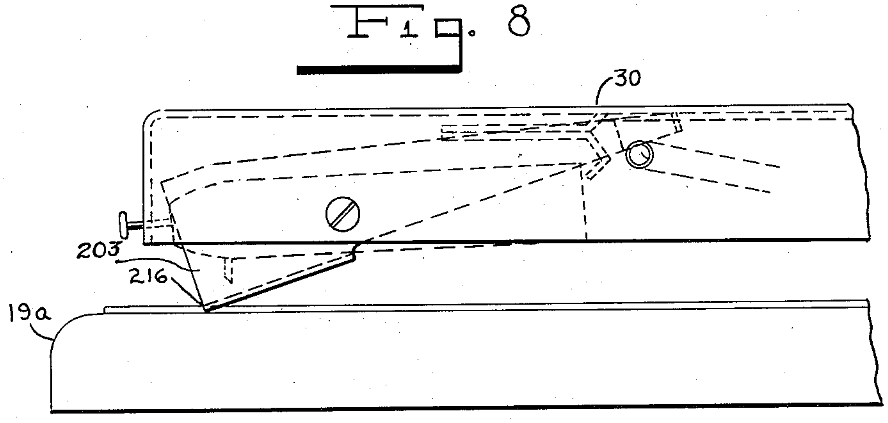
Figure 8 is a side view corresponding to that of Figure 7 showing the automatic indexing element of the cutting arm in operation.

Thus when the cutting arm 30 is raised as shown in Figure 8, the lower surface of the cartridge 116 bears against portion 215 of flange 205 to rotate the margin finding lever 200 in a counterclockwise direction to lower the extension 203 and hence to bring the end 216 of the flanges 205 down against the turntable. Rearward extension 204 of the margin finding lever 200 is provided with a weight 220 and the forward section 213 may be cut out at 221 to make it lighter in weight so that when the margin finding lever 200 is free to rotate, it will tend to rotate in a clockwise direction, the extension 204 and its weight 220 overbalancing the extension 203 and its flange 205.

Figure 9:
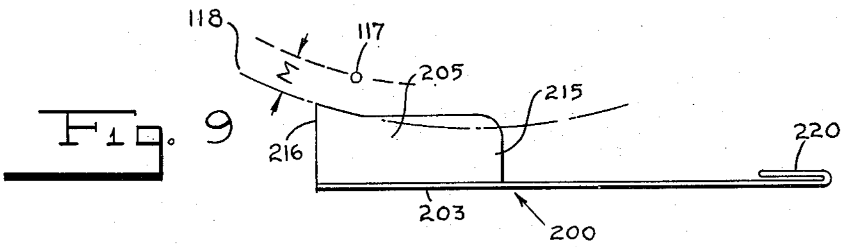
Figure 9 is a top view of the indexing member of Figures 7 and 8.
Figure 10:
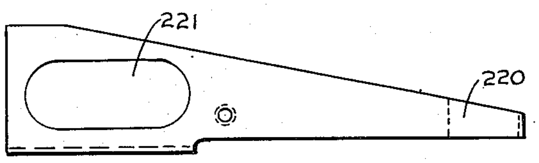
Figure 10 is a side view of the indexing member of Figures 7 and 8.

As seen in Figure 9, the end 216 of flange 205 is so arranged that a distance M exists between the inner edge of end 216 and the stylus 117. This distance is the desired margin between the edge of record 118 and the point where cutting is to be initiated. Thus when the cutting arm 30 is raised, the weight of cartridge 116 will rotate the margin finder 200 from the position shown in Figure 7 to the position shown in Figure 8. This will lower flange 205 and bring its end 216 to a position substantially flush with the top of the turntable. The edge of the turntable may be beveled as at 19*a* to ensure that the end 216 of the margin finding device will ride up on the turntable.

As the cutting arm 30 is rotated inwardly, the end 216 will engage the side of the record 118 and will halt further inward rotation of the cutting arm 30. In the case of the use of this margin finding device in connection with the automatic recorder, thus far disclosed, the frictional connection comprising plate 146 and flange 105 between the auxiliary motor 23 and cam 45 on the one hand and post 94 on the other may be such that the engagement of end 216 of the margin finder 200 against the side of the record 118 will permit plate 146 to continue to rotate without rotating post 94. Thus the engagement of the end 216 of the margin finder 200 against the side of the record will take the place of the engagement of flange 105 against the pin 180 in Figure 4, and cutting arm 30 will be stopped at exactly the right position to establish exactly the right margin for the particular record.

Then as the cutting arm 30 is lowered into position, the stylus 117 will engage the record; on continuing the lowering of the cutting arm 30, the cartridge 116 will be rotated upwardly around its pivot 211 and the weight 220 of the margin finder 200 will correspondingly raise the end 203 of the margin finder. When the cutting arm 30 is in the right position, the cartridge 116 has been raised up within the flanges of the cutting arm 30 as shown in Figure 7 and the weight 220 has rotated the margin finder device 200 to the point where the flange 205 bears against the underside of the flange of the cutting arm 30

The bottom of cartridge 116 during actual recording clears the top surface of flange 205. In appropriate cases a coil spring may be placed around the pivot 201 to ensure the rotation of the margin finding lever 200 from the position of Figure 8 back to the position of Figure 7, or a small tension or compression spring may be used between the margin finding lever 200 and the cutting arm 30 at any appropriate point to bias the margin finding lever 200 toward clockwise rotation. Where such a spring is used, it should have less force than the weight of the cartridge 116 bearing down on portion 215 of flange 205 so that the spring may be overcome to rotate the lever 200 counterclockwise to the position of Figure 8 when the cutting arm 30 is raised.

When the margin finder 200 of Figures 7 to 10 is thus used, the automatic operation of the automatic recorder requires simply placing a record on the turntable and pressing the switch E. A slight circuit change is necessary consisting of combining switch D with switch G in the form of a single pole double throw switch so that when switch G is open, the automatic feature is operable, whereas when switch G is closed, during the playing back of a record or the manual recording of a record, the automatic feature is inoperable.

All operations then take place from initiating the recording to the return of the cutting arm to the original position at the end of the recording.

The setting of an index pointer for any size record is obviated, and records of varying sizes may be cut without any attention to the differences in their sizes. Also, records of un-predetermined size may be cut.

It is obvious that the margin finder of Figures 7 to 10 is not necessarily limited to use in connection with automatic recorders. It may be used even with non-automatic records to establish the appropriate margin and it is not necessarily limited to recording arms but may be used in connection with pick up arms also to establish the appropriate margin, as for instance, in automatic record change operation.

It will also be obvious that my novel automatic means for moving the cutting arm to the beginning of the record and for removing the cutting arm from the record at the end of the record, may be utilized in connection with the pick-up arm to make the pick-up arm automatic or as an adjunct to a record changer. Accordingly, the term "recording arm" in the following claims include both the pick-up arm and cutting arm.

In the foregoing I have described my invention solely in connection with specific illustrative embodiments thereof. Since many variations and modifications of my invention should now be obvious to those skilled in the art, I prefer to be bound not by the specific disclosures herein but only by the appended claims.

I claim:

1. In a phonograph recorder having a turntable and a recording arm, said turntable and recording arm being rotatable in a horizontal plane about a pivot individual to each thereof; said recording arm carrying a recording member engageable with a record on the surface of said turntable; said recording arm and recording member being movable about the pivot of the recording arm from beyond the edge of the turntable toward the pivot of the turntable and back; the pivot of said recording arm comprising a rotatable vertically slidable post; a horizontal cam and means for rotating the cam; a connection between the cam and the post for rotating the post in one direction during a first portion of the rotation of the cam and in the opposite direction during the remainder of the rotation of the cam; a lever pivoted in a vertical plane having a portion thereof connected to the post and another portion carrying a cam-follower bearing on a surface of said cam; the cam surface having a plurality of curves, one curve, on initiation of rotation of the cam, operating the cam-follower to raise the lever, the post and its recording arm; the said cam on continuation of the first portion of rotation thereof rotating the post; a second curve of the cam surface engaging the cam-follower on completion of the first portion of rotation of the cam to lower the lever, the post and the recording arm.

2. In a phonograph recorder having a turntable and a recording arm, said turntable and recording arm being rotatable in a horizontal plane about a pivot individual to each thereof; said recording arm carrying a recording member engageable with a record on the surface of said turntable; said recording arm and recording member being movable about the pivot of the recording arm from beyond the edge of the turntable toward the pivot of the turntable and back; the pivot of said recording arm comprising a rotatable vertically slidable post; a horizontal cam and means for rotating the cam; a connection between the cam and the post for rotating the post in one direction during a first portion of the rotation of the cam and in the opposite direction during the remainder of the rotation of the cam; a lever pivoted in a vertical plane having a portion thereof connected to the post and another portion carrying a cam-follower bearing on a surface of said cam; the cam surface having a plurality of curves, one curve, on initiation of rotation of the cam, operating the cam-follower to raise the lever, the post and its recording arm; the said cam on continuation of the first portion of rotation thereof rotating the post; a second curve of the cam surface engaging the cam-follower on completion of the first portion of rotation of the cam to lower the lever, the post and the recording arm, the connection between the cam and the post for rotating the post comprising a clutch operable only when said post is raised.

3. In a phonograph recorder having a turntable and a recording arm, said turntable and recording arm being rotatable in a horizontal plane about a pivot individual to each thereof; said recording arm carrying a recording member engageable with a record on the surface of said turntable; said recording arm and recording member being movable about the pivot of the recording arm from beyond the edge of the turntable toward the pivot of the turntable and back; the pivot of said recording arm comprising a rotatable vertically slidable post; a horizontal cam and means for rotating the cam; a connection between the cam and the post for rotating the post in one direction during a first portion of the rotation of the cam and in the opposite direction during the remainder of the rotation of the cam; a lever pivoted in a vertical plane having a portion thereof connected to the post and another portion carrying a cam-follower bearing on a surface of said cam; the cam surface having a plurality of curves, one curve, on initiation of rotation of the cam, operating the cam-follower to raise the lever, the post and its recording arm; the said cam on continuation of the first portion of rotation thereof rotating the post; a second curve of the cam surface engaging the cam-follower on completion of the first portion of rotation of the cam to lower the lever, the post and the recording arm, the connection between the cam and the post for rotating the post comprising a clutch operable only when said post is raised; a third curve of the cam surface engaging the cam-follower, on initiation of the remainder of rotation of the cam, to raise the lever, the post and recording arm; the said cam and on continuation of the remainder of rotation thereof, rotating the post in an opposite sense to the first mentioned rotation.

4. In a phonograph recorder having a turntable and a recording arm, said turntable and recording arm being rotatable in a horizontal plane about a pivot individual to each thereof; said recording arm carrying a recording member engageable with a record on the surface of said turntable; said recording arm and recording member being movable about the pivot of the recording arm from beyond the edge of the turntable toward the pivot of the turntable and back; said recording member including a stylus mounted in a cartridge, said cartridge being pivoted on said arm for vertical movement with respect thereto; a lever pivoted on said arm for vertical movement with respect thereto; said lever having a lighter end and a heavier end; said cartridge moving down with respect to said arm when the arm is raised; an extension of the lighter end of said lever engaged by said cartridge when said cartridge moves down with respect to the arm, said cartridge moving the lighter end of the lever down with respect to the arm and beyond the lower surface of the arm and stylus when the arm is raised; said cartridge and stylus being raised with respect to the arm when the arm is lowered; said lighter end of the lever engaging the edge of a record on the turntable and blocking movement of the arm toward the pivot of the turntable; the heavier end of the lever rotating the lighter end thereof out of said engagement when the arm is lowered so that the stylus engages a record on the turntable.

5. In a phonograph recorder having a turntable and a recording arm, said turntable and recording arm being rotatable in a horizontal plane about a pivot individual to each thereof; said recording arm carrying a recording member engageable with a record on the surface of said turntable; said recording arm and recording member being movable about the pivot of the recording arm from beyond the edge of the turntable toward the pivot of the turntable and back; the pivot of said recording arm comprising a rotatable vertically slidable post; a horizontal cam and means for rotating the cam; a connection between the cam and the post for rotating the post in one direction during a first portion of the rotation of the cam and in the opposite direction during the remainder of the rotation of the cam; a lever pivoted in a vertical plane having a portion thereof connected to the post and another portion carrying a cam-follower bearing on a surface of said cam; the cam surface having a plurality of curves, one curve on initiation of rotation of the cam, operating the cam-follower to raise the lever, the post and its recording arm; the said cam on continuation of the first portion of rotation thereof rotating the post; a second curve of the cam surface engaging the cam-follower on completion of the first portion of rotation of the cam to lower the lever, the post and the recording arm, the connection between the cam and the post for rotating the post comprising a clutch operable only when said post is raised; a third curve of the cam surface engaging the cam-follower on initiation of the remainder of rotation of the cam to raise the lever, the post and recording arm; the said cam on continuation of the remainder of rotation thereof, rotating the post in an opposite sense to the first mentioned rotation.

ROBERT M. CAIN.

REFERENCES CITED

The following references are of record in the file of this patent:

UNITED STATES PATENTS

| Number | Name | Date |
|---|---|---|
| 1,438,000 | Underhill | Dec. 5, 1922 |
| 1,872,706 | Erbe | Aug. 23, 1932 |
| 1,962,858 | Collison et al. | June 12, 1934 |
| 2,012,185 | Erbe | Aug. 20, 1935 |
| 2,018,881 | Collison et al. | Oct. 29, 1935 |
| 2,068,449 | Downs | Jan. 19, 1937 |
| 2,145,743 | Welch | Jan. 31, 1939 |
| 2,271,001 | Fortune | Jan. 27, 1942 |
| 2,287,726 | Cranmer | June 23, 1942 |
| 2,333,414 | De Tar | Nov. 2, 1943 |
| 2,348,506 | Weaver, II | May 9, 1944 |
| 2,374,570 | Weaver | Apr. 24, 1945 |
| 2,437,557 | Rockola et al. | Mar. 9, 1948 |
| 2,486,898 | Wennebro | Nov. 1, 1949 |